(12) United States Patent
Irie et al.

(10) Patent No.: US 12,361,261 B2
(45) Date of Patent: Jul. 15, 2025

(54) SIGNAL PROCESSING DEVICE AND SIGNAL PROCESSING METHOD

(71) Applicant: SONY GROUP CORPORATION, Tokyo (JP)

(72) Inventors: Daisuke Irie, Tokyo (JP); Shuichi Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 443 days.

(21) Appl. No.: 17/635,671

(22) PCT Filed: Jul. 10, 2020

(86) PCT No.: PCT/JP2020/027156
§ 371 (c)(1),
(2) Date: Feb. 15, 2022

(87) PCT Pub. No.: WO2021/039154
PCT Pub. Date: Mar. 4, 2021

(65) Prior Publication Data
US 2022/0309615 A1 Sep. 29, 2022

(30) Foreign Application Priority Data
Aug. 23, 2019 (JP) .................................. 2019-152438

(51) Int. Cl.
*G06T 5/00* (2024.01)
*G06N 3/045* (2023.01)

(52) U.S. Cl.
CPC ............... *G06T 5/00* (2013.01); *G06N 3/045* (2023.01); *G06T 2207/10016* (2013.01); *G06T 2207/20084* (2013.01)

(58) Field of Classification Search
CPC ... G06T 3/4053; G06T 3/4092; G06T 3/4061; G06T 3/4069; G06T 3/4076; H04N 19/59; H04N 7/0125; H04N 7/0117
See application file for complete search history.

(56) References Cited

U.S. PATENT DOCUMENTS

2016/0345009 A1*  11/2016  Zhong ................ H04N 19/40
2019/0028705 A1*   1/2019  Xu .................... H04N 19/40
2021/0192687 A1*   6/2021  Liu .................... G06T 3/4046

FOREIGN PATENT DOCUMENTS

JP  2010-066925 A   3/2010
JP  2012-195880 A  10/2012

(Continued)

OTHER PUBLICATIONS

Xu, Jingyao, et al. "Fast H. 264 to HEVC transcoding: A deep learning method." IEEE Transactions on Multimedia 21.7 (2018): 1633-1645. (Year: 2018).*

(Continued)

*Primary Examiner* — Raphael Schwartz
(74) *Attorney, Agent, or Firm* — CHIP LAW GROUP

(57) ABSTRACT

Quality improvement processing to which a learning result is applied can be performed appropriately even if the signal characteristics of an input signal are different from the signal characteristics of student data at the time of learning. A quality improvement processing unit applies quality improvement processing to an input signal to obtain an output signal using a learning result obtained using a signal of a first domain having first signal characteristics as student data. A domain conversion unit converts the input signal to a signal of the first domain and sends the same to a quality improvement processing unit when the input signal is a signal of a second domain having second signal characteristics different from the first signal characteristics.

10 Claims, 11 Drawing Sheets

(56) References Cited

FOREIGN PATENT DOCUMENTS

| JP | 2018-109996 A | 7/2018 |
|---|---|---|
| JP | 2019-216848 A | 12/2019 |
| WO | 2019/240257 A1 | 12/2019 |

OTHER PUBLICATIONS

International Search Report and Written Opinion of PCT Application No. PCT/JP2020/027156, issued on Sep. 24, 2020, 09 pages of ISRWO.

Sekiwa, et al., "Enlargement of digital images by multi-neural network based on local variance", The transactions of the Institute of Electronics, Information and Communication Engineers, vol. J81-A, No. 4, Apr. 25, 1998, pp. 790-798.

* cited by examiner

SIGNAL PROCESSING DEVICE AND SIGNAL PROCESSING METHOD

CROSS REFERENCE TO RELATED APPLICATIONS

This application is a U.S. National Phase of International Patent Application No. PCT/JP2020/027156 filed on Jul. 10, 2020, which claims priority benefit of Japanese Patent Application No. JP 2019-152438 filed in the Japan Patent Office on Aug. 23, 2019. Each of the above-referenced applications is hereby incorporated herein by reference in its entirety.

TECHNICAL FIELD

The present technology relates to a signal processing device, a signal processing method, and a program, and more particularly to a signal processing device and the like that perform quality improvement processing to which learning results are applied.

BACKGROUND ART

Conventionally, it has been known that, for example, a video signal is subjected to image quality improvement processing using a learning result. In such image quality improvement processing, if the signal characteristics of an input video signal are different from the signal characteristics of the student data at the time of learning, that is, if the input video signal is an unknown video signal, the image quality improvement processing may not be performed appropriately.

In this case, it is conceivable to performing learn directly on an unknown video signal, or to perform learning as online or background processing. However, the teacher data in that case needs to have the same video content as the unknown video signal and a high image quality, and such teacher data cannot usually be obtained.

For example, PTL 1 discloses a technique of optimizing preprocessing (the function of a contractor) of input data so that the learning result of a learning machine is the best. When the learning machine is used as an image quality improvement processing unit, learning cannot be performed because there is no teacher data paired with an unknown video signal. Further, since the technique described in PTL 1 is an invention related to a learning method and does not take inference into consideration, it is not possible to continuously output a signal, and it is necessary to switch between learning and inference.

CITATION LIST

Patent Literature

[PTL 1]
JP 2018-109996 A

SUMMARY

Technical Problem

An object of the present technology is to enable quality improvement processing to which a learning result is applied to be performed appropriately even if the signal characteristics of an input signal are different from the signal characteristics of student data at the time of learning.

Solution to Problem

The concept of the present technology is a signal processing device including: a quality improvement processing unit that applies quality improvement processing to an input signal to obtain an output signal using a learning result obtained using a signal of a first domain having first signal characteristics as student data; and a domain conversion unit that converts the input signal to a signal of the first domain when the input signal is a signal of a second domain having second signal characteristics different from the first signal characteristics.

In the present technology, the quality improvement processing unit uses the learning result obtained using a signal of a first domain having first signal characteristics as student data. This quality improvement processing unit applies image quality improvement processing to the input signal to obtain an output signal. The domain conversion unit converts the input signal to a signal of the first domain when the input signal is a signal of a second domain having second signal characteristics different from the first signal characteristics.

For example, the signal processing device may further include a switch that sends the input signal to the quality improvement processing unit when the input signal is the signal of the first domain and sends the input signal to the domain conversion unit when the input signal is the signal of the second domain. For example, the input signal may be a video signal. For example, the quality improvement processing unit may be configured of a deep neural network. For example, the domain conversion unit may be configured of a deep neural network.

For example, when the input signal is the signal of the second domain, the domain conversion unit may extract a learning result corresponding to the signal of the second domain from a learning result holding unit and apply the learning result. As a result, the domain conversion unit can apply the learning result that matches the signal characteristics of the signal of the second domain, and can accurately convert the input signal to the signal of the first domain.

In this case, for example, the signal processing device may further include a signal output unit that outputs the input signal as an output signal as it is when the learning result corresponding to the signal of the second domain is not present in the learning result holding unit. In this way, a signal having at least the same quality as the input signal can be output as an output signal.

In this case, for example, the signal processing device may further include a learning unit that performs learning based on the input signal to obtain a learning result corresponding to the signal of the second domain when the learning result corresponding to the signal of the second domain is not present in the learning result holding unit. At this time, for example, the learning unit may use the input signal as student data and performs learning using student data used in the learning of the quality improvement processing unit as teacher data. As a result, when the subsequent input signal is a signal of the second domain having the same signal characteristics, the learning result obtained by the learning unit can be applied to the domain conversion unit, and the input signal can be converted to the signal of the first domain with high accuracy.

As described above, in the present technology, when the input signal is a signal of the second domain, the domain conversion unit converts this input signal into a signal of the first domain. Therefore, even if the input signal is a signal of the second domain, the quality improvement processing unit which uses the learning result obtained using the signal of the first domain as student data can appropriately perform quality improvement processing to obtain an output signal.

In the present technology, for example, the signal processing device may further include a discriminator for discriminating the domain of the input signal. In this case, for example, the discriminator may be configured of a multi-class classifier. In this case, for example, the discriminator may discriminate the domain of the input signal based on metadata attached to the input signal. By providing the discriminator in this way, it is possible to discriminate the domain of the input signal, and perform appropriate processing on the input signal for respective domains.

DESCRIPTION OF EMBODIMENTS

Figure 1:
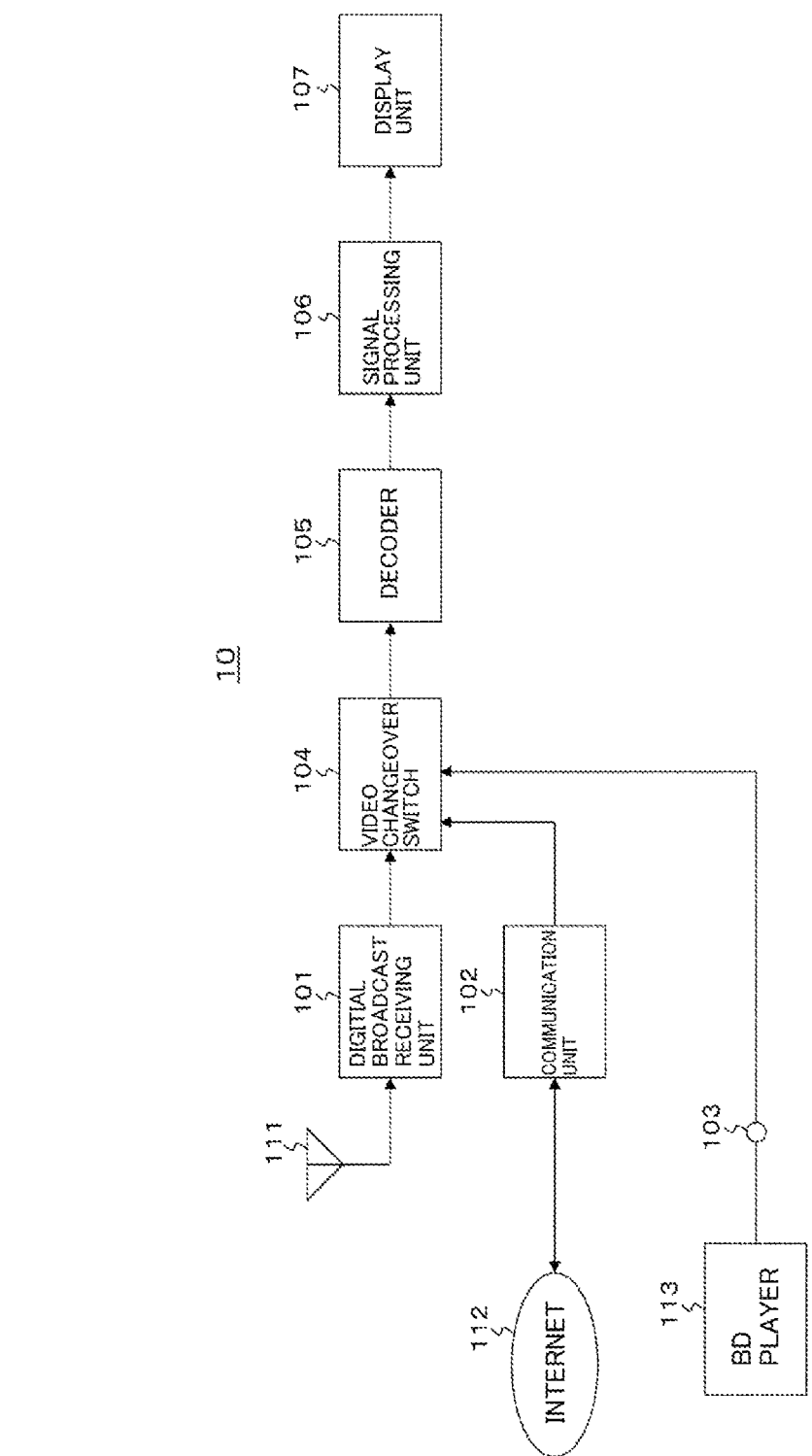
FIG. 1 is a block diagram illustrating a configuration example of a television receiver as an embodiment.

Hereinafter, modes for carrying out the present technology (hereinafter referred to as embodiments) will be described. The description will be made in the following order.
1. Embodiment
2. Modified Example 1. Embodiment Configuration of Television Receiver FIG. 1 illustrates a configuration example of a television receiver 10 as an embodiment. The television receiver 10 has a digital broadcast receiving unit 101, a communication unit 102, an external input terminal 103, a video changeover switch 104, a decoder 105, a signal processing unit 106, and a display unit 107.

The digital broadcast receiving unit 101 processes a television broadcast signal input from a receiving antenna 111 to obtain a coded video signal related to the broadcast content. The communication unit 102 communicates with an external server via the Internet 112 to obtain a coded video signal related to the Internet content. The external input terminal 103 inputs a coded video signal related to the playback content from the BD (Blu-ray Disc) player 113. As the type of codec of the coded video signal, for example, MPEG-2, MPEG-4, MPEG-4 AVC, HEVC, and the like can be considered.

The video changeover switch 104 selectively outputs any of coded video signals among a coded video signal related to broadcast content obtained by the digital broadcast receiving unit 101, a coded video signal related to Internet content obtained by the communication unit 102, and a coded video signal related to the playback content input to the external input terminal 103 based on a user operation, for example.

The decoder 105 performs decoding processing on the coded video signal obtained by the video changeover switch 104 to obtain a baseband video signal. Since this video signal has different signal characteristics due to differences between broadcast content, Internet content, and playback content, differences between codecs, differences between moving images and still images, and the like, the video signal may be signals of a large number of domains (signal characteristics). For example, signals of multiple domains may be due to codec differences only.

The signal processing unit 106 applies image quality improvement processing using the video signal obtained by the decoder 105 as an input signal to output a video signal as an output signal. The image quality improvement processing includes super resolution (SR) processing, noise reduction (NR) processing, and high dynamic range processing. The display unit 107 displays an image based on the video signal output from the signal processing unit 106.

Configuration Example of Signal Processing Unit

Figure 2:
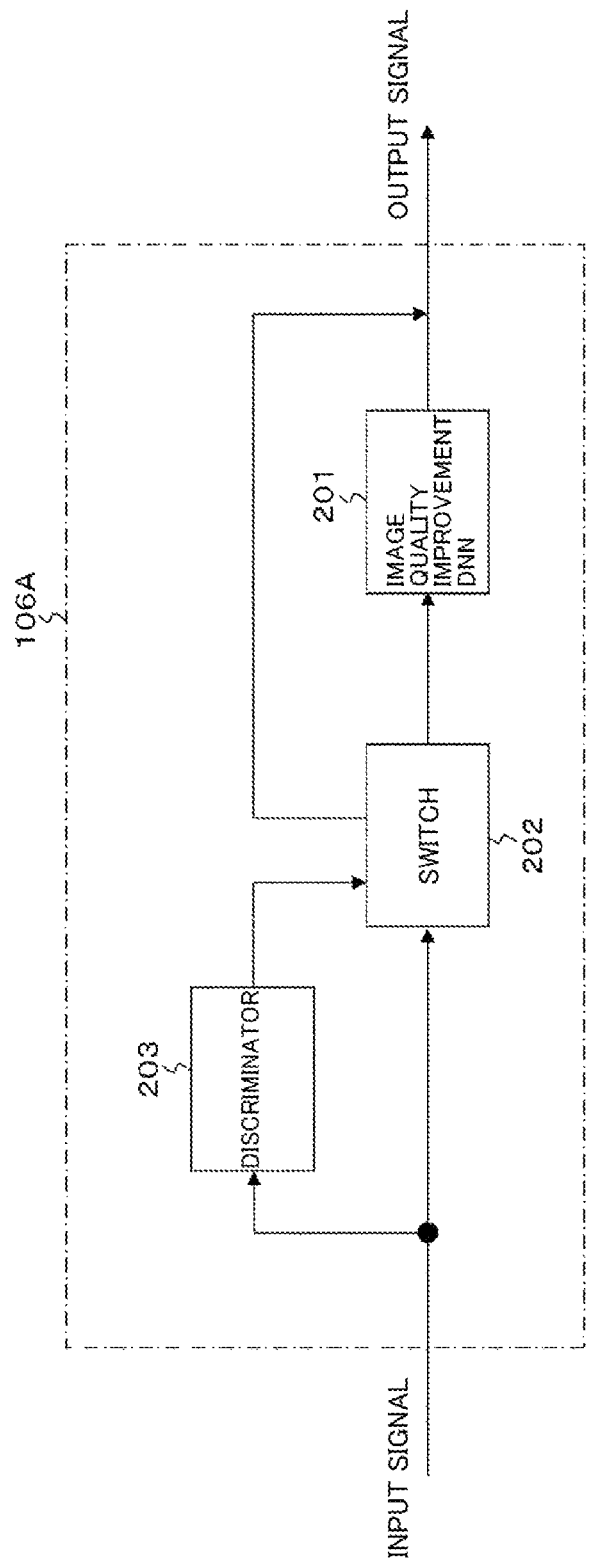
FIG. 2 is a block diagram illustrating a configuration example of a signal processing unit in a television receiver.

FIG. 2 illustrates a configuration example of the signal processing unit 106 in the television receiver 10 of FIG. 1. Here, a signal processing unit 106A will be described. The signal processing unit 106A has an image quality improvement DNN (Deep Neural Network) 201, a switch 202, and a discriminator 203.

The image quality improvement DNN 201 constitutes a quality improvement processing unit. In this image quality improvement DNN 201, the learning result using the signal of the first domain as the student data is used. Here, the signal of the first domain corresponds to, for example, the baseband video signal obtained by decoding the HEVC coded video signal output from the decoder 105 in the television receiver 10 illustrated in FIG. 1.

Figure 3:
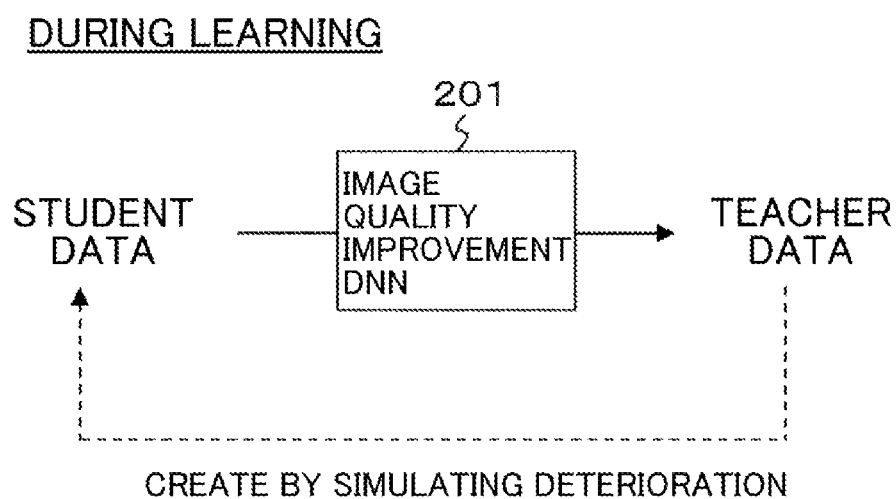
FIG. 3 is a diagram for explaining student data and teacher data at the time of learning in image quality improvement DNN.

The image quality improvement DNN 201 performs learning in advance at the design stage and implements the weight and network architecture at that time as hardware. For teacher data during learning, high-quality data that has as little deterioration as possible is used. As illustrated in FIG. 3, at the time of learning, data obtained by applying processing to the teacher data so as to reproduce the deterioration due to the actual transmission system by simulation is used as the student data. The learning conditions and hyperparameters may be determined so that the highest quality is obtained in the designed DNN architecture, and there are no particular restrictions on the DNN design.

During operation of the system, the image quality improvement DNN 201 applies the image quality improvement processing to the input signal based on the weight and the network based on the learning result as described above. In the image quality improvement DNN 201, a correct inference result is obtained when the signal characteristics of the input signal are close to the signal characteristics of the student data at the time of learning. However, if the signal characteristics of the input signal are not close to the signal characteristics of the student data at the time of learning, the image quality improvement DNN 201 cannot exhibit its performance. In this embodiment, it is assumed that the student data at the time of learning is obtained by decoding, for example, a coded video signal coded by HEVC.

The discriminator 203 discriminates the domain of the input signal. When the signal characteristics of the input signal are close to the signal characteristics of the student data at the time of learning of the image quality improvement DNN 201, the discriminator 203 discriminates the domain of the input signal as the first domain. For example, if the input signal is obtained by decoding a coded video signal coded by HEVC, the domain of this input signal is discriminated as the first domain.

On the other hand, when the signal characteristics of the input signal are not close to the signal characteristics of the student data at the time of learning of the image quality improvement DNN 201, the discriminator 203 discriminates the domain of the input signal as the second domain. In this embodiment, when the input signal is obtained by decoding a coded video signal coded by, for example, MPEG-2, MPEG-4, MPEG-4 AVC, and the like other than HEVC, the domain of this input signal is discriminated as a second domain.

The switch 202 switches the output destination of the input signal based on the discrimination result of the discriminator 203. In this case, when the discriminator 203 discriminates the domain of the input signal as the first domain, the switch 202 outputs the input signal to the image quality improvement DNN 201. On the other hand, when the discriminator 203 discriminates the domain of the input signal as the second domain, the switch 202 uses the input signal as it is as the output signal of the signal processing unit 106A.

In the case of the signal processing unit 106A, when the signal characteristics of the input signal are close to the signal characteristics of the student data at the time of learning of the image quality improvement DNN 201, this input signal is supplied to the image quality improvement DNN 201 through the switch 202 and image quality improvement processing is applied to the input signal. In this case, in the image quality improvement DNN 201, a correct inference result is obtained. The processed signal obtained by this image quality improvement DNN 201 becomes an output signal of the signal processing unit 106A.

On the other hand, in the case of this signal processing unit 106A, if the signal characteristics of the input signal are not close to the signal characteristics of the student data at the time of learning of the image quality improvement DNN 201, the switch 202 uses the input signal as it is as the output signal of the signal processing unit 106A. As a result, it is possible to avoid a signal with an image quality failure from being as an output signal of the signal processing unit 106A.

Another Configuration Example of Signal Processing Unit

Figure 4:
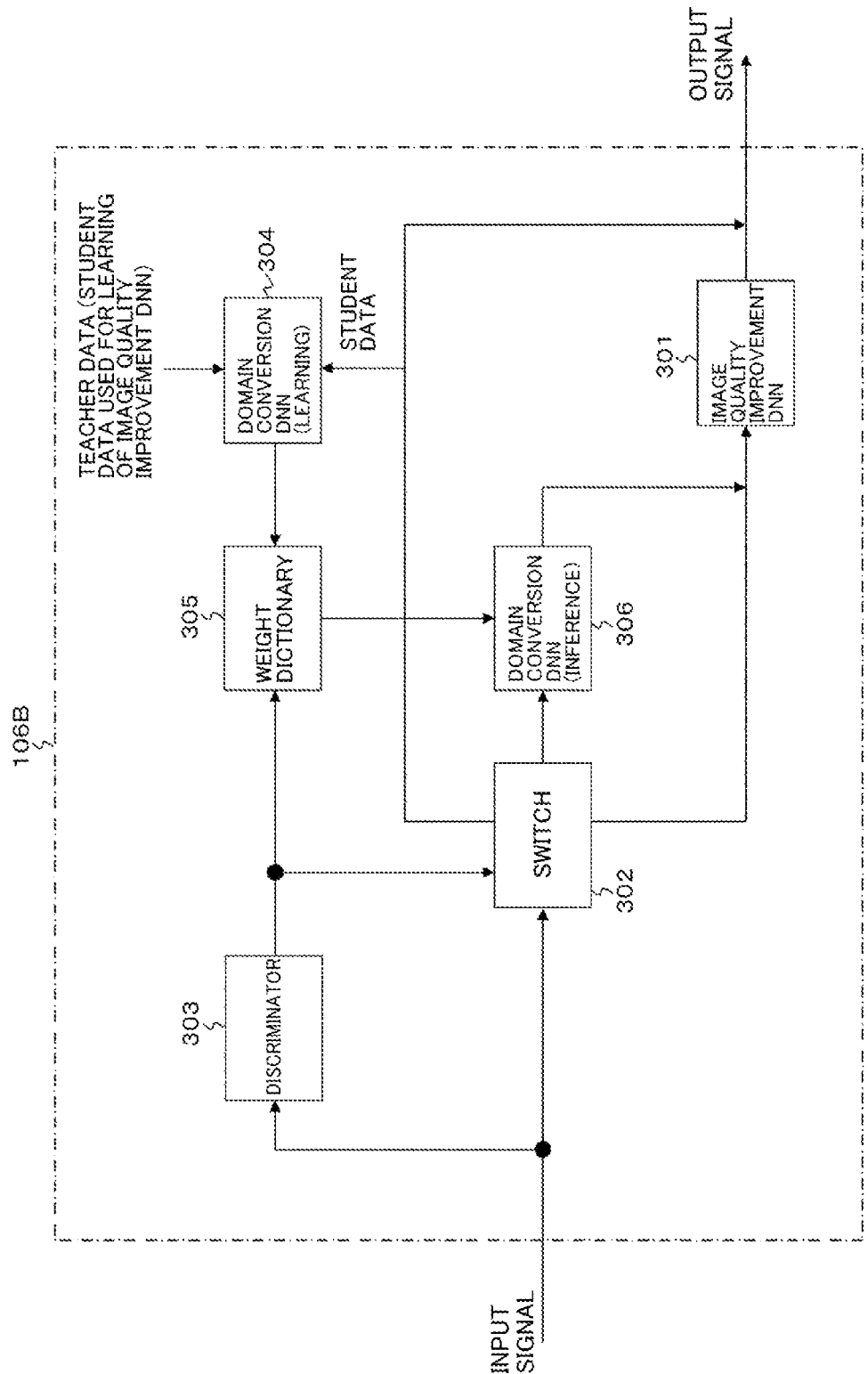
FIG. 4 is a block diagram illustrating another configuration example of a signal processing unit in a television receiver.

FIG. 4 illustrates another configuration example of the signal processing unit 106 in the television receiver 10 of FIG. 1. Here, a signal processing unit 106B will be described. The signal processing unit 106B has an image quality improvement DNN (Deep Neural Network) 301, a switch 302, a discriminator 303, a domain conversion DNN (learning) 304, a weight dictionary 305, and a domain conversion DNN (inference) 306.

The image quality improvement DNN 301 constitutes an image quality improvement processing unit. Although detailed description thereof is omitted, the learning result using the signal of the first domain as the student data is used in this image quality improvement DNN 301 similarly to the image quality improvement DNN 201 of the signal processing unit 106A of FIG. 2. Here, the signal of the first domain corresponds to, for example, the baseband video signal obtained by decoding the HEVC coded video signal output from the decoder 105 in the television receiver 10 illustrated in FIG. 1.

The discriminator 303 discriminates the domain of the input signal. When the signal characteristics of the input signal are close to the signal characteristics of the student data at the time of learning of the image quality improvement DNN 301, the discriminator 303 regards this input signal as known data, discriminates the domain of the input signal as the first domain, and output class number 1.

When the signal characteristics of the input signal are not close to the signal characteristics of the student data at the time of learning of the image quality improvement DNN 301, the discriminator 303 regards this input signal as unknown data and discriminates the domain of the input signal as the second domain. In this case, each time new unknown data is input as an input signal, the discriminator 303 performs learning to discriminate the new unknown data and outputs a class number X which is the maximum value+1 of the known class number.

In the pre-learning, the discriminator 303 regards the student data at the time of learning of the image quality improvement DNN 301 as known data, and performs learning such that the class is discriminated as class 1 when this known data is input and the class is discriminated as, for example, class 0 when data having a different domain from the known data is input. In this case, the correct label "class 1" is assigned to the known data, the correct label "class 0" is assigned to the data having a different domain from the known data, and the correspondence is learned. Here, the data of class 0 needs only to have a domain different from the known data. For example, the data can be created by changing the conditions of the deterioration simulation at the time of creating the student data, or data (domain) in which it is known that the image quality improvement effect of the image quality improvement DNN is low may be used if such data is present. The discriminator 303 implements the weight and the network architecture after learning as hardware. The discriminator 303 stores the data set of the known data in a memory (not illustrated).

When the input signal is not discriminated as class 1 during operation of the system, the discriminator 303 starts learning using this input signal as unknown data. Learning is performed on the data set of known data (class 1) stored in the memory and the data set of unknown data (correct label is "class 2") such that the known data is discriminated as class 1 and the unknown data is discriminated as class 2.

The discriminator 303 implements the weight and the network architecture after learning as hardware. The discriminator 303 stores the data set of this unknown data in a memory (not illustrated) together with the above-mentioned data set of known data.

Here, the learning ending condition may be, for example, that the number of weight updates reaches a specified value, or that the discrimination result of the test data separated from the data set exceeds a specified accuracy.

After that, when the input signal is not discriminated as class 1 or class 2, the discriminator 303 starts learning using this input signal as new unknown data. Learning is performed on the data set of the known data (class 1) and the data set of the learned unknown data (class 2) stored in the memory, and a data set of new unknown data (correct label is "class 3") such that the known data is discriminated as class 1, the learned unknown data is discriminated as class 2, and the new unknown data is discriminated as class 3. The discriminator 303 implements the weight and the network architecture after learning by hardware. The discriminator 303 stores this new data set of unknown data in a memory (not illustrated) together with the above-mentioned data sets of known data and learned unknown data.

Similarly, the discriminator 303 performs learning so that new unknown data is further discriminated each time an input signal which is new unknown data is input. In this case, the discriminator 303 performs learning so that the new unknown data is discriminated as a class having a class number which is the maximum value+1 of a known class number (class number already used).

The discriminator 303 sends the class number to the weight dictionary 305 every time an input signal which is new unknown data is input and learned. As a result, the weight dictionary 305 stores and holds the class number in correlation with the weight which is the learning result obtained by performing learning using an input signal, which is the new unknown data, as student data by the domain conversion DNN (learning) 304, which will be described in detail later.

The discriminator 303 sends a command signal to the switch 302 during operation of the system. When the discriminator 303 discriminates the input signal as class 1, the discriminator 303 sends a command signal (class number 1) to the switch 302 so as to output the input signal to the image quality improvement DNN 301. As a result, the switch 302 performs switching so that the input signal is output to the image quality improvement DNN 301.

When the discriminator 303 discriminates the input signal as a class (class X) other than class 1, the discriminator 303 sends a command signal (class number X) to the switch 302 so as to output the input signal to the domain conversion DNN (inference) 306. As a result, the switch 302 performs switching so that the input signal is output to the domain conversion DNN (inference) 306.

When the discriminator 303 cannot discriminate the input signal as any of the already learned classes and learns the input signal as unknown data as described above, the discriminator 303 sends a specific command signal to the switch 302 so as to output the input signal as it is as an output signal of the signal processing unit 106B and to output the input signal to the domain conversion DNN (learning) 304 described later. As a result, the switch 302 performs switching so that the input signal is output as it is as an output signal of the signal processing unit 106B and is output to the domain conversion DNN (learning) 304.

The domain conversion DNN (learning) 304 does not require pre-learning. In addition, in order to improve the learning efficiency during operation of the system and reduce the time required for learning, learning may be performed on some student data in advance and the weight which is the learning result may be used as an initial value.

During operation of the system, when the discriminator 303 cannot discriminate an input signal as any of the already learned classes, and the input signal is determined as unknown data and is discriminated as a new class, the domain conversion DNN (learning) 304 performs learning based on the input signal. In this case, the domain conversion DNN (learning) 304 uses the input signal (unknown data) as student data, and uses the student data used during learning of the image quality improvement DNN 301 as teacher data. When learning is performed under this condition, the image quality improvement DNN 301 is likely to output high-quality signals (see FIG. 3).

The learning ending condition may be, for example, that the number of weight updates reaches a specified value, or the probability that the conversion result is applied to the discriminator 303 (the learning must be completed first) and is discriminated as a learned class by the discriminator 303 is greater than or equal to a specified value.

The weight which is the learning result of the domain conversion DNN (learning) 304 is stored and held in the weight dictionary 305. In this case, as described above, the weight is stored and held in a state of correlated with the class number sent from the discriminator 303.

Here, the weight dictionary 305 will be described. The weight dictionary 305 constitutes a learning result holding unit. The weight dictionary 305 is a memory (storage) for storing data in a dictionary format. The weight dictionary 305 stores data in a dictionary format with the class number sent from the discriminator 303 as a key and the weight obtained by the domain conversion DNN (learning) 304 as a value. Every time input signals having various signal characteristics are input and the discriminator 303 and the domain conversion DNN (learning) 304 perform learning, the data in the weight dictionary 305 increases.

As an operation during operation of the system, the weight dictionary 305 receives the class number and the weight and registers the same in a dictionary as described above when the discriminator 303 and the domain conversion DNN (learning) 304 perform learning. Further, at the time of inference of the domain conversion DNN (inference) 306, the weight dictionary 305 receives the designation (class number) of a class level from the discriminator 303, and sends a value corresponding to the designation to the domain conversion DNN (inference) 306.

The domain conversion DNN (inference) 306 constitutes a domain conversion unit. The domain conversion DNN (inference) 306 does not require pre-learning. This domain conversion DNN (inference) 306 has the same network architecture as the domain conversion DNN (learning). During operation of the system, when the discriminator 303 discriminates an input signal as a class (class X) other than class 1 as described above, the domain conversion DNN (inference) 306 receives the weight correlated with the class number X from the weight dictionary 305 and applies the same as a network coefficient.

Then, the domain conversion DNN (inference) 306 performs domain conversion for converting the input signal supplied through the switch 302 from the second domain to the first domain. In this case, the input signal is converted from a signal having the signal characteristics of class X to a signal having the signal characteristics of class 1. The domain conversion DNN (inference) 306 sends the signal having the converted domain to the image quality improvement DNN 301. The image quality improvement DNN 301 applies image quality improvement processing to this signal, and outputs the processed signal as an output signal of the signal processing unit 106B.

Figure 5:
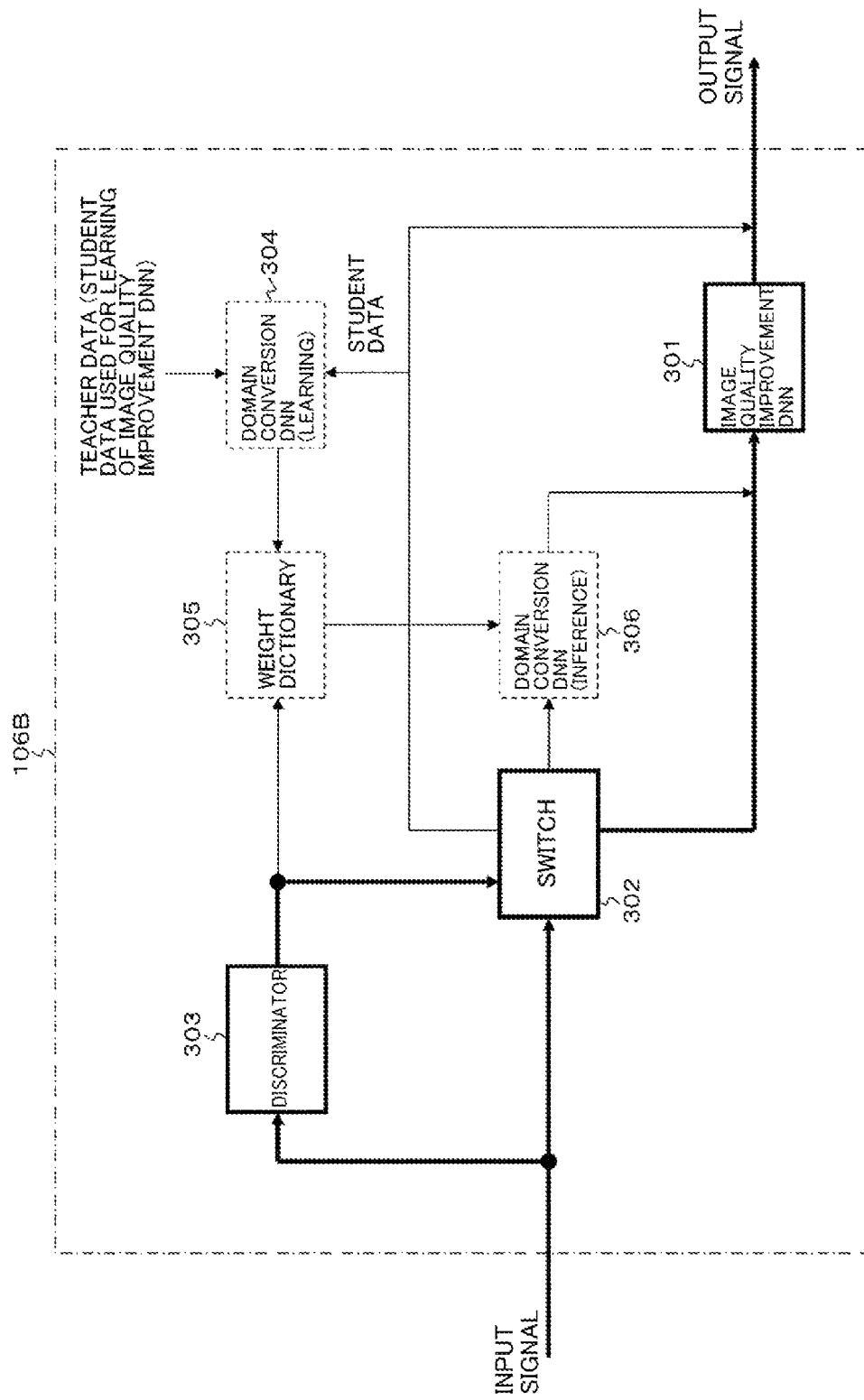
FIG. 5 is a diagram for explaining the operation of the signal processing unit when an input signal is discriminated as class 1 by the discriminator.

The operation of the signal processing unit 106B will be described. First, a case where the input signal is discriminated as class 1 by the discriminator 303 will be described. In this case, as indicated by a thick line in FIG. 5, the operation is related to the discriminator 303, the switch 302, and the image quality improvement DNN 301.

In this case, a command signal (class number 1) is sent from the discriminator 303 to the switch 302. The switching of the switch 302 is controlled so that the input signal is sent to the image quality improvement DNN 301. In the image quality improvement DNN 301, image quality improvement processing is applied to this input signal, and the processed signal is output as an output signal of the signal processing unit 106B.

Figure 6:
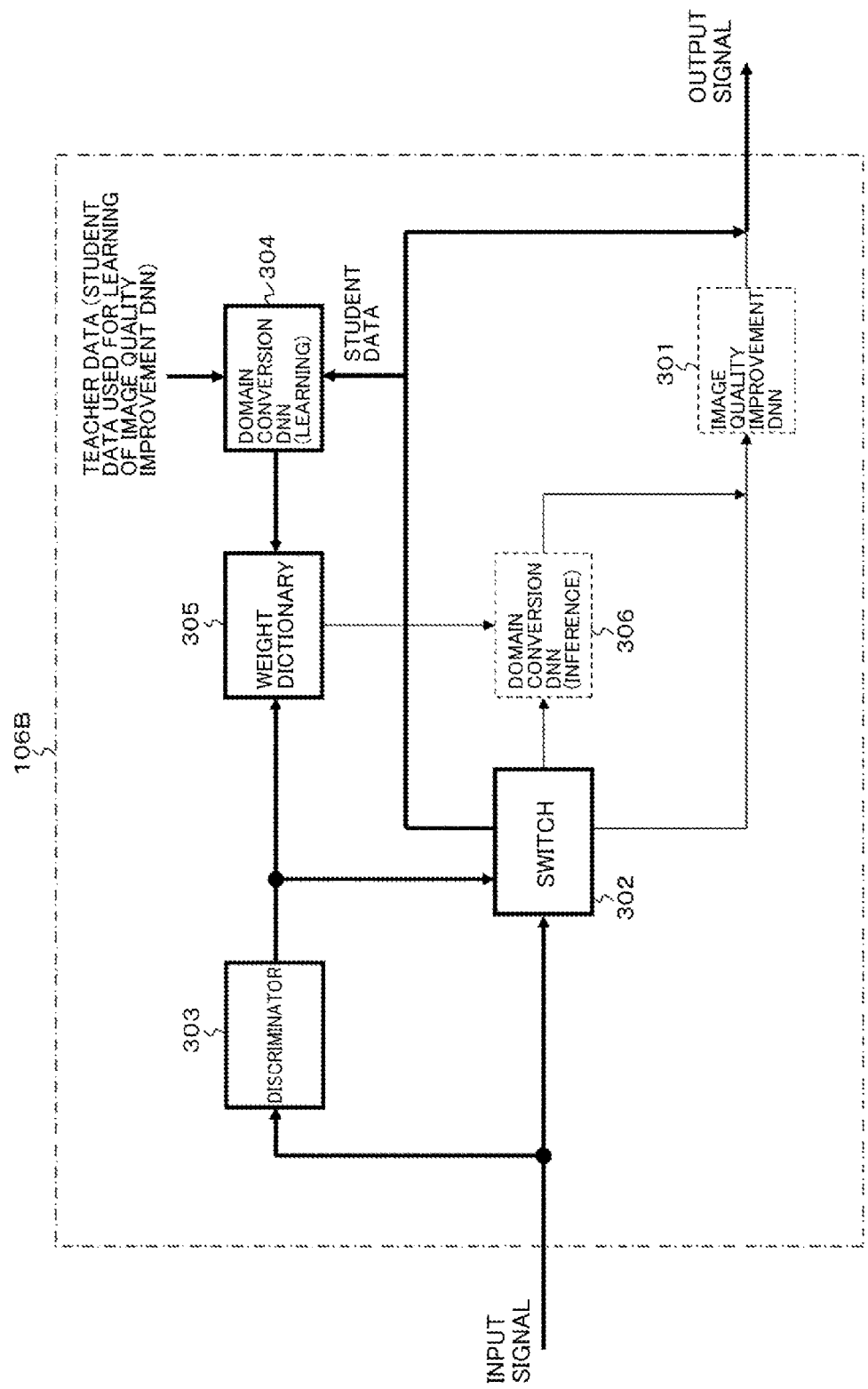
FIG. 6 is a diagram for explaining the operation of the signal processing unit when an input signal cannot be discriminated as any of the already learned classes by the discriminator.

Next, a case where the input signal cannot be discriminated as any of the already learned classes by the discriminator 303 and learning is performed using the input signal as unknown data will be described. In this case, as indicated by a thick line in FIG. 6, an operation is related to the discriminator 303, the switch 302, the domain conversion DNN (learning) 304, and the weight dictionary 305.

In this case, the discriminator 303 performs learning so that the input signal (unknown data) is discriminated as a class having a class number M which is the maximum value+1 of a known class number (class number already used). Then, in this case, a specific command signal corresponding to the case where the input signal is unknown data is sent from the discriminator 303 to the switch 302. The switching of the switch 302 is controlled so that the input signal is output as it is as an output signal of the signal processing unit 106B and is sent to the domain conversion DNN (learning) 304.

In this case, in the domain conversion DNN (learning) 304, learning is performed using the input signal (unknown data) as the student data and the student data used at the time of learning of the image quality improvement DNN 301 as the teacher data. Then, the weight which is the learning result is stored and held in the weight dictionary 305. In this case, the weight is stored and held in a state of being correlated with the class number learned by the discriminator 303.

Figure 7:
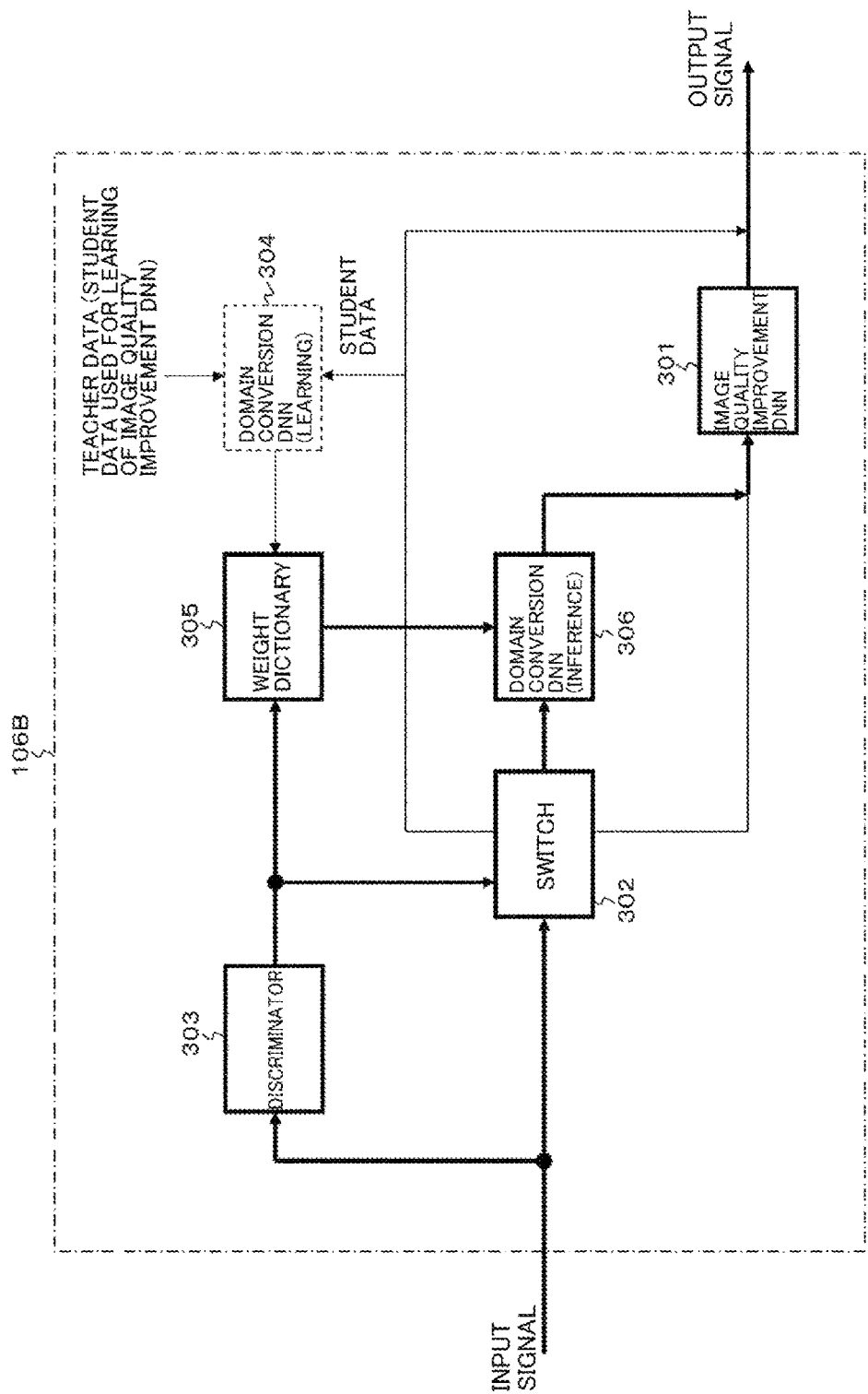
FIG. 7 is a diagram for explaining the operation of the signal processing unit when an input signal is discriminated as a class (class X) other than class 1 by the discriminator.

Next, a case where the input signal is discriminated as a class (class X) other than class 1 by the discriminator 303 will be described. In this case, as indicated by a thick line in FIG. 7, the operation is related to the discriminator 303, the switch 302, the image quality improvement DNN 301, the weight dictionary 305, and the domain conversion DNN (inference) 306.

In this case, a command signal (class number X) is sent from the discriminator 303 to the switch 302. The switching of the switch 302 is controlled so that the input signal is sent to the domain conversion DNN (inference) 306. In the domain conversion DNN (inference) 306, the weight correlated with the class number X is received from the weight dictionary 305 and applied as a network coefficient, and the input signal converted from a signal having the signal characteristics of class X to a signal having the signal characteristics of class 1.

The signal thus converted by the domain conversion DNN (inference) 306 is sent to the image quality improvement DNN 301. In the image quality improvement DNN 301, image quality improvement processing is applied to this signal, and the processed signal is output as an output signal of the signal processing unit 106B.

A portion or an entirety of the processing of each part of the signal processing unit 106B can be performed by software processing by a computer.

The flowcharts of FIGS. 8 to 11 illustrate an example of the processing procedure of the signal processing unit 106B. In step ST1, the signal processing unit 106 starts processing in response to a signal input, for example. Next, in step ST2, the signal processing unit 106B discriminates the class of the input signal using the discriminator 303.

Next, in step ST3, the signal processing unit 106B determines whether the class is class 1. When it is class 1, the signal processing unit 106B performs first signal processing in step ST4. On the other hand, when it is not class 1, the signal processing unit 106B determines in step ST5 whether it is class X (class other than class 1).

When it is class X, the signal processing unit 106B performs second signal processing in step ST6. On the other hand, when it is not class X, that is, when the discriminator 303 cannot discriminate the input signal as class 1 or class X in step ST2, the signal processing unit 106B performs third signal processing in step ST7.

Figure 8:
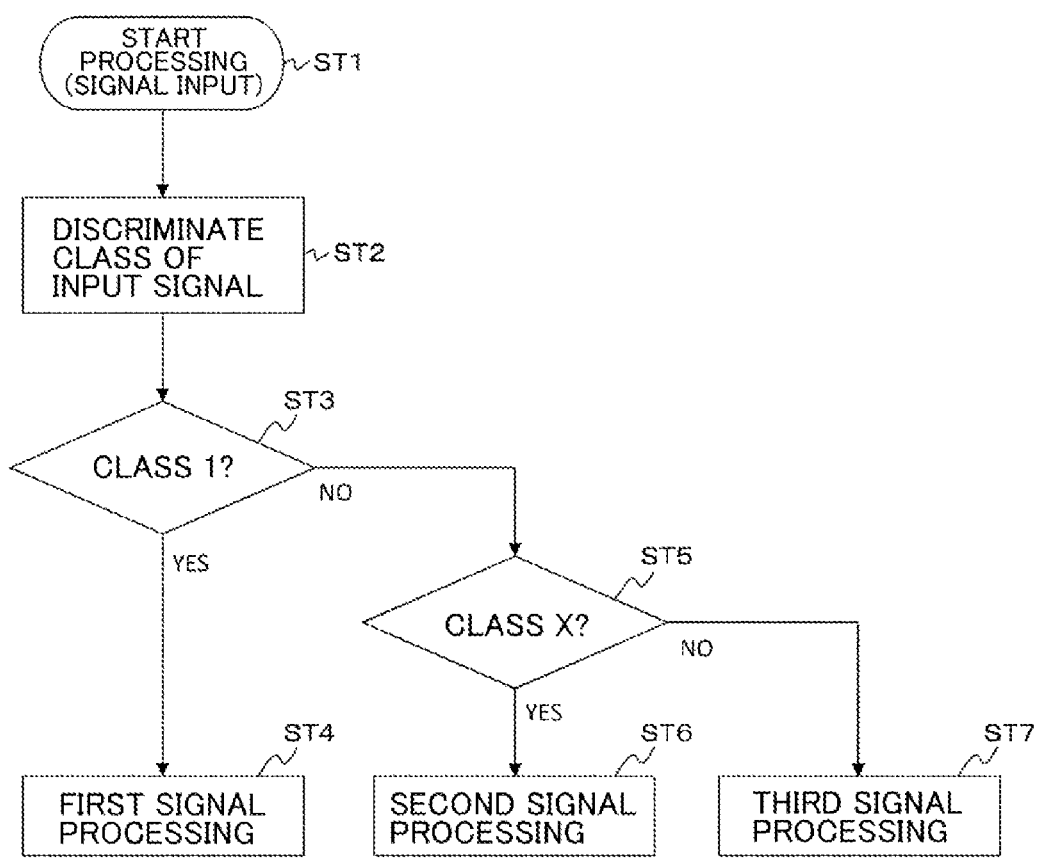
FIG. 8 is a flowchart (entire flowchart) illustrating an example of a processing procedure of the signal processing unit.
Figure 9:
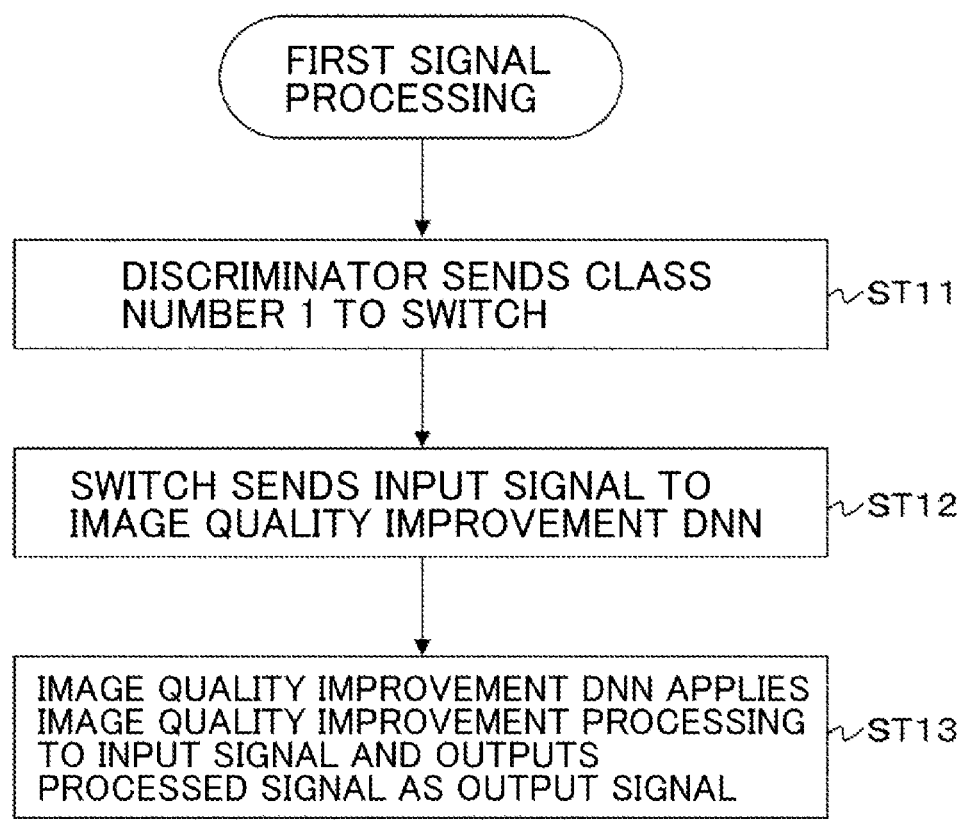
FIG. 9 is a flowchart (first signal processing) illustrating an example of the processing procedure of the signal processing unit.

The flowchart of FIG. 9 illustrates the processing procedure of the first signal processing (see FIG. 5) in step ST4 of FIG. 8. In step ST11, the signal processing unit 106B sends the class number 1 to the switch 302 as a command signal using the discriminator 303.

Next, in step ST12, the signal processing unit 106B sends the input signal to the image quality improvement DNN 301 by switching the switch 302. Then, in step ST13, the signal processing unit 106B applies the image quality improvement processing to the input signal using the image quality improvement DNN 301, and outputs the processed signal as an output signal.

Figure 10:
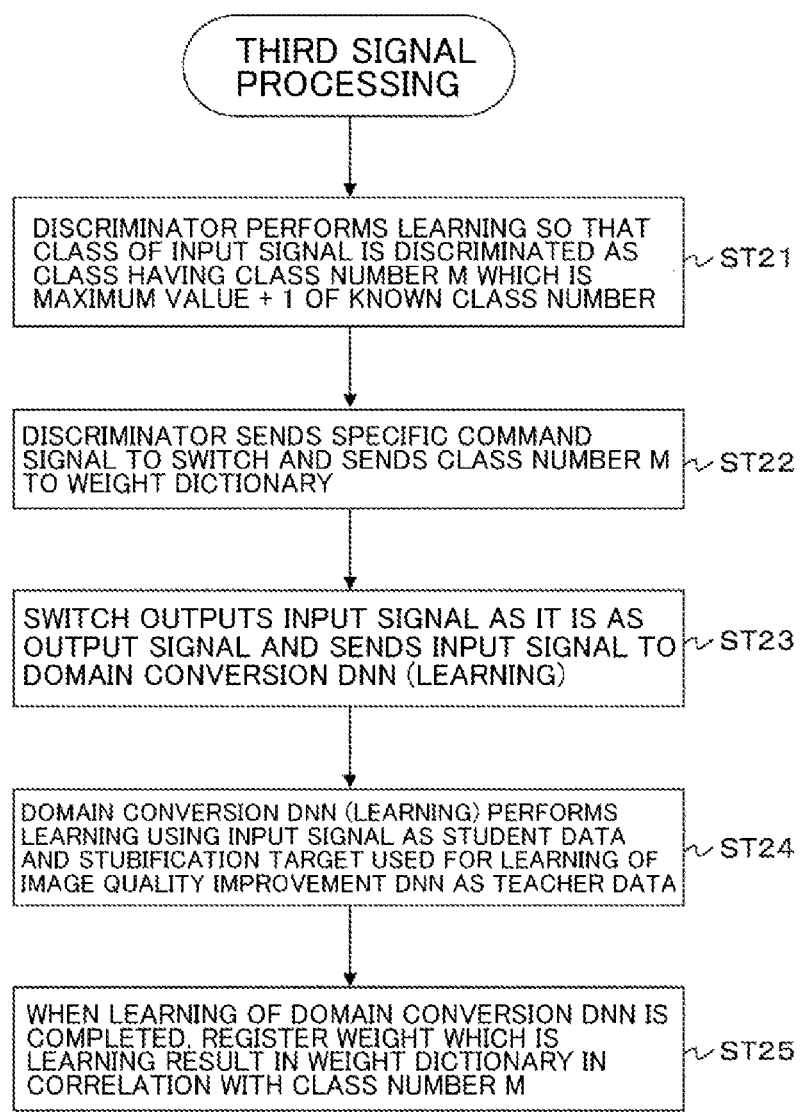
FIG. 10 is a flowchart (second signal processing) illustrating an example of the processing procedure of the signal processing unit.

The flowchart of FIG. 10 illustrates the processing procedure of the third signal processing (see FIG. 6) in step ST7 of FIG. 8. In step ST21, the signal processing unit 106B performs learning so that the class of the input signal (unknown data) is discriminated by the discriminator 303 as the class having the class number M which is the maximum value+1 of a known class number (class number already used).

Next, in step ST22, the signal processing unit 106B sends a specific command signal corresponding to the case where the input signal is unknown data to the switch 302 and sends the class number M to the weight dictionary 305 using the discriminator 303. Next, in step ST23, the signal processing unit 106B outputs the input signal as it is as an output signal and sends the input signal to the domain conversion DNN (learning) 304 by switching the switch 302.

Next, in step ST24, the signal processing unit 106B performs learning using the domain conversion DNN (inference) 306 using the input signal as the student data and the student data used for learning of the image quality improvement DNN 301 as the teacher data. Next, in step ST25, when the learning of the domain conversion DNN (inference) 306 ends, the signal processing unit 106B registers (stores and holds) the weight which is the learning result in the weight dictionary 305 in correlation with the class number M.

Figure 11:
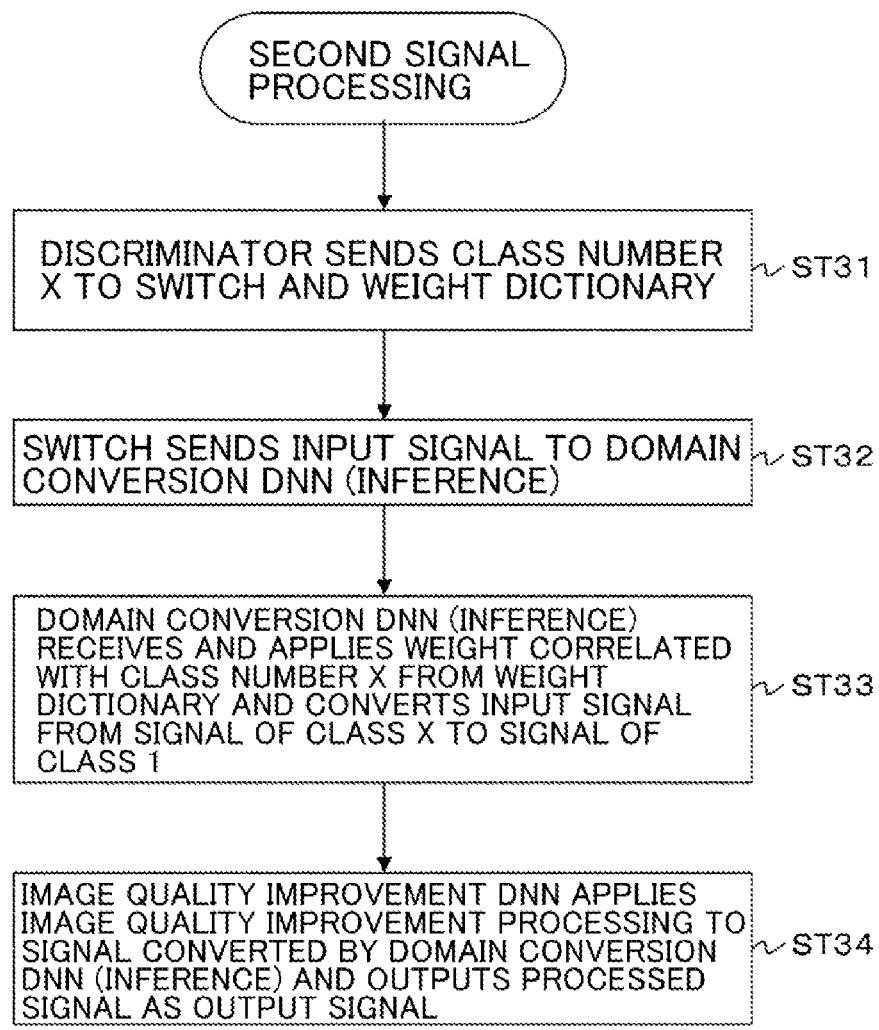
FIG. 11 is a flowchart (third signal processing) illustrating an example of the processing procedure of the signal processing unit.

The flowchart of FIG. 11 illustrates the processing procedure of the second signal processing (see FIG. 7) in step ST6 of FIG. 8. The signal processing unit 106B sends the class number X to the switch 302 as a command signal and sends the class number X to the weight dictionary 305 using the discriminator 303. Next, in step ST32, the signal processing unit 106B sends an input signal to the domain conversion DNN (inference) 306 by switching the switch 302.

Next, in step ST33, the signal processing unit 106B receives and applies the weight correlated with the class number X from the weight dictionary 305, and converts the input signal from a signal of class X to a signal of class 1 using the domain conversion DNN (inference) 306. Next, in step ST34, the signal processing unit 106B applies the image quality improvement processing to the signal converted by the domain conversion DNN (inference) 306, and outputs the processed signal as an output signal using the image quality improvement DNN 301.

As described above, in the first signal processing (see FIGS. 5 and 9) and the third signal processing (see FIGS. 7 and 10), basically, a signal (signal with improved image quality) that has been processed by the image quality improvement DNN 301 is output as the output signal of the signal processing unit 106B. However, when the image quality improvement processing is turned off by user control, the input signal may be output as it is as the output signal of the signal processing unit 106B by the switching of the switch 302 even when the discriminator 303 discriminates the input signal as a signal of class 1 or class X.

As described above, in the signal processing unit 106B illustrated in FIG. 4, when the input signal is a signal of class X different from the signal of class 1 learned by the image quality improvement DNN 301, the input signal is converted to the signal of class 1 by the domain conversion DNN 306 and is subjected to image quality improvement processing by the image quality improvement DNN 301. Therefore, even when the input signal is a signal of class X, quality improvement processing can be performed appropriately on the input signal by the image quality improvement DNN 301 and a good signal with improved image quality can be output.

In the signal processing unit 106B illustrated in FIG. 4, if the input signal is neither a signal of class 1 learned by the image quality improvement DNN 301 nor a signal of class X already learned, the input signal is outputs as it is as an output signal of the signal processing unit 106B, and learning of the input signal is performed by the discriminator 303 and the domain conversion DNN (learning) 304. Therefore, it is possible to perform learning of the discriminator 303 and the domain conversion DNN (learning) 304 while constantly outputting the signal.

The signal processing unit 106B illustrated in FIG. 4 includes the two DNNs of the domain conversion DNN (learning) 304 and the domain conversion DNN (inference) 306. However, since these domain conversion DNNs have the same architecture, only one DNN may be included.

In the calculation of the Cost function at the time of learning of the domain conversion DNN (learning) 304 of the signal processing unit 106B illustrated in FIG. 4, the discriminator 303 may be used for learning as an evaluation function. That is, learning of the domain conversion DNN (learning) 304 is performed so that the domain conversion result is determined to be class 1 (known data) by the discriminator 303.

In the signal processing unit 106B illustrated in FIG. 4, a multi-class classifier is used as the discriminator 303, but the signal characteristics (domain) and class number of the input signal may be directly linked using the metadata attached to the input signal. As described above, since the input signals have different signal characteristics (domains) due to differences between broadcast content, Internet content, and playback content, differences between codecs, differences between moving images and still images, and the like, the metadata may be data that shows some or all of the differences. For example, the metadata may be only data indicating the codec related to an input signal.

2. Modified Example

In the above-described embodiment, an example in which the present technology is applied to the television receiver 10 (see FIG. 1) is illustrated. However, the present technology can be similarly applied to other electronic devices such as PCs (Personal Computers), smartphones, game machines, HMDs (Head Mounted Display), projectors, players, digital cameras, and the like.

In the above-described embodiment, an example in which the input signal is a video signal is illustrated. However, even if the input signal is an audio signal, the present technology can be applied in the same manner.

Although the preferred embodiments of the present disclosure have been described in detail with reference to the accompanying figures as described above, the technical scope of the present disclosure is not limited to such examples. It is apparent that those having ordinary knowledge in the technical field of the present disclosure could conceive various modified examples or changed examples within the scope of the technical ideas set forth in the claims, and it should be understood that these also naturally fall within the technical scope of the present disclosure.

Further, the effects described in the present specification are merely explanatory or exemplary and are not intended as limiting. That is, the techniques according to the present disclosure may exhibit other effects apparent to those skilled in the art from the description herein, in addition to or in place of the above effects.

Further, the present technology can also have the following configurations.

(1) A signal processing device including: a quality improvement processing unit that applies quality improvement processing to an input signal to obtain an output signal using a learning result obtained using a signal of a first domain having first signal characteristics as student data; and a domain conversion unit that converts the input signal to a signal of the first domain when the input signal is a signal of a second domain having second signal characteristics different from the first signal characteristics.

(2) The signal processing device according to (1), further including a switch that sends the input signal to the quality improvement processing unit when the input signal is the signal of the first domain and sends the input signal to the domain conversion unit when the input signal is the signal of the second domain.

(3) The signal processing device according to (1) or (2), wherein when the input signal is the signal of the second domain, the domain conversion unit extracts a learning result corresponding to the signal of the second domain from a learning result holding unit and applies the learning result.

(4) The signal processing device according to (3), further including a signal output unit that outputs the input signal as an output signal as it is when the learning result corresponding to the signal of the second domain is not present in the learning result holding unit.

(5) The signal processing device according to (4), further including a learning unit that performs learning based on the input signal to obtain a learning result corresponding to the signal of the second domain when the learning result corresponding to the signal of the second domain is not present in the learning result holding unit.

(6) The signal processing device according to (5), wherein the learning unit uses the input signal as student data and performs learning using student data used in the learning of the quality improvement processing unit as teacher data.

(7) The signal processing device according to any one of (1) to (6), further including a discriminator for discriminating the domain of the input signal.

(8) The signal processing device according to (7), wherein the discriminator is configured of a multi-class classifier.

(9) The signal processing device according to (7), wherein the discriminator discriminates the domain of the input signal based on metadata attached to the input signal.

(10) The signal processing device according to any one of (1) to (9), wherein the input signal is a video signal.

(11) The signal processing device according to any one of (1) to (10), wherein the quality improvement processing unit is configured of a deep neural network.

(12) The signal processing device according to any one of (1) to (11), wherein the domain conversion unit is configured of a deep neural network.

(13) A signal processing method including: applying quality improvement processing to an input signal to obtain an output signal using a learning result obtained using a signal of a first domain having first signal characteristics as student data; and converting the input signal to a signal of the first domain when the input signal is a signal of a second domain having second signal characteristics different from the first signal characteristics.

(14) A program for causing a computer to function as: quality improvement processing means for applying quality improvement processing to an input signal to obtain an output signal using a learning result obtained using a signal of a first domain having first signal characteristics as student data; and domain conversion means for converting the input signal to a signal of the first domain when the input signal is a signal of a second domain having second signal characteristics different from the first signal characteristics.

REFERENCE SIGNS LIST

10 Television receiver
101 Digital broadcast receiving unit
102 Communication unit
103 External input terminal
104 Video changeover switch
105 Decoder
106, 106A, 106B Signal processing unit
107 Display unit
111 Antenna
112 Internet
113 BD player
201 Image quality improvement DNN
202 Switch
203 Discriminator
301 Signal processing unit
302 Switch
303 Discriminator
304 Domain conversion DNN (learning)
305 Weight dictionary
306 Domain conversion DNN (inference)

The invention claimed is:

1. An image signal processing device, comprising:
circuitry configured to:
obtain an input signal of an image;
determine whether the input signal represents:
a first signal of a first domain having first signal characteristics, wherein the first signal is learned to obtain a, learning result for quality improvement processing, or
a second signal of a second domain having second signal characteristics different from the first signal characteristics, wherein the second signal is unknown data for a learning result of the input signal
apply, based on a determination that the input signal represents the first signal, the quality improvement processing to the input signal to obtain an output signal, wherein the output signal is obtained based on the learning result from the first signal; and
update, based on a determination that the input signal represents the second signal, the learning result associated with the second signal based on the second signal such that the quality improvement processing corresponds to the second signal,
wherein the update of the learning result uses as teacher data for the second signal, data which was used as student data for the first signal during learning of the quality improvement processing.

2. The image signal processing device according to claim 1, wherein the circuitry is further configured to:
convert the input signal to the first signal in a case where:
the input signal represents the second signal, and
the update of the learning result based on the second signal.

3. The image signal processing device according to claim 1, wherein the circuitry comprises a discriminator configured to discriminate the input signal in one of the first domain or the second domain.

4. The image signal processing device according to claim 3, wherein the discriminator is further configured of a multi-class classifier.

5. The image signal processing device according to claim 3, wherein the discriminator is further configured to discriminate the input signal in one of the first domain or the second domain, based on metadata of the input signal.

6. The image signal processing device according to claim 1, wherein the input signal is a video signal.

7. The image signal processing device according to claim 1, wherein the circuitry comprises a deep neural network associated with the quality improvement processing.

8. The image signal processing device according to claim 1, wherein the circuitry comprises a deep neural network for conversion of the input signal of the second domain to the first signal of the first domain.

9. A image signal processing method, comprising:
obtaining an input signal of an image;
determining whether the input signal represents:
a first signal of a first domain having first signal characteristics, wherein the first signal is learned to obtain a learning result for quality improvement processing, or
a second signal of a second domain having second signal characteristics different from the first signal characteristics, wherein the second signal is unknown data for a learning result of the input signal
applying based on a determination that the input signal represents the first signal, the quality improvement processing to the input signal to obtain an output signal, wherein the output signal is obtained based on the learning result from the first signal; and
updating, based on a determination that the input signal represents the second signal, the learning result associated with the second signal based on the second signal such that the quality improvement processing corresponds to the second signal,
wherein the updating of the learning result uses as teacher data for the second signal, data which was used as student data for the first signal during learning of the quality improvement processing.

10. A non-transitory computer readable medium having stored thereon, computer executable instructions, which when executed by a computer, cause the computer to execute operations, the operations comprising:
obtaining an input signal of an image;
determining whether the input signal represents:

a first signal of a first domain having first signal characteristics, wherein the first signal is learned to obtain a learning result for quality improvement processing, or a second signal of a second domain having second signal characteristics different from the first signal characteristics, wherein the second signal is unknown data for a learning result of the input signal applying, based on a determination that the input signal represents the first signal, the quality improvement processing to the input signal to obtain an output signal, wherein the output signal is obtained based on the learning result from the first signal; and updating, based on a determination that the input signal represents the second signal, the learning result associated with the second signal based on the second signal such that the quality improvement processing corresponds to the second signal, wherein the updating of the learning result uses as teacher data for the second signal, data which was used as student data for the first signal during learning of the quality improvement processing.

* * * * *